US012322227B2

(12) United States Patent
Tahara et al.

(10) Patent No.: US 12,322,227 B2
(45) Date of Patent: Jun. 3, 2025

(54) DATA RECORDING DEVICE AND METHOD

(71) Applicant: TOYOTA JIDOSHA KABUSHIKI KAISHA, Toyota (JP)

(72) Inventors: Jun Tahara, Toyota (JP); Yohei Ogawa, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 352 days.

(21) Appl. No.: 17/987,947

(22) Filed: Nov. 16, 2022

(65) Prior Publication Data

US 2023/0252834 A1 Aug. 10, 2023

(30) Foreign Application Priority Data

Feb. 9, 2022 (JP) ................................ 2022-018593

(51) Int. Cl.
*G07C 5/08* (2006.01)
*G07C 5/00* (2006.01)

(52) U.S. Cl.
CPC ............. *G07C 5/085* (2013.01); *G07C 5/008* (2013.01)

(58) Field of Classification Search
CPC ........... G07C 5/085; G07C 5/008; G07C 5/12
See application file for complete search history.

(56) References Cited

U.S. PATENT DOCUMENTS

| | | | | |
|---|---|---|---|---|
| 10,431,015 B2 * | 10/2019 | Uno | ....................... | G07C 5/008 |
| 2021/0188295 A1 * | 6/2021 | Hirashima | .......... | B60W 50/045 |

FOREIGN PATENT DOCUMENTS

| | | |
|---|---|---|
| JP | H10-177663 A | 6/1998 |
| JP | 2012-190202 A | 10/2012 |
| JP | 2016-132368 A | 7/2016 |
| JP | 2021-096713 A | 6/2021 |
| WO | 2016-116978 A1 | 7/2016 |

* cited by examiner

*Primary Examiner* — Michael V Kerrigan
(74) *Attorney, Agent, or Firm* — Dinsmore & Shohl LLP

(57) ABSTRACT

A data recording device of this disclosure records, in a basic recording period, a plurality of pieces of data on the state of a vehicle, the pieces of data being to be each acquired in a predetermined sampling period, the basic recording period being longer than the predetermined sampling period. The data recording device records at least one specified data specified by a vehicle external device among the pieces of data in a shortened recording period equal to or more than the predetermined sampling period but less than the basic recording period.

4 Claims, 3 Drawing Sheets

| DATA POSITION / DATA TYPE | ··· | 1 | 2 | 3 | 4 | 5 | 6 | 7 | 8 | ··· |
|---|---|---|---|---|---|---|---|---|---|---|
| DID: $**** VEHICLE SPEED | ··· | 7 | 5 | 4 | 3 | 2 | 0 | 0 | 0 | ··· |
| DID: $xxxx ENGINE REVOLUTION SPEED | ··· | 900 | 800 | 600 | 400 | 200 | 0 | 0 | 0 | ··· |
| ⋮ | ⋮ | | | | | | | | | |
| DID: $**** AAA | ··· | ○ | ○ | □ | △ | △ | 0 | 0 | 0 | ··· |

FIG. 5

| DATA POSITION / DATA TYPE | … | −2 | −1 | 0 | 1 | 2 | … |
|---|---|---|---|---|---|---|---|
| DID : $**** VEHICLE SPEED | … | 8 | 0 | 0 | 0 | 0 | … |
| OPTIONAL RECORDING DATA [0] | … | 8 | 0 | DID : $**** | 0 | 0 | … |
| OPTIONAL RECORDING DATA [1] | … | 8 | 3 | DID : $**** | 0 | 0 | … |
| OPTIONAL RECORDING DATA [2] | … | 8 | 4 | DID : $**** | 0 | 0 | … |
| OPTIONAL RECORDING DATA [3] | … | 7 | 5 | DID : $**** | 0 | 0 | … |
| OPTIONAL RECORDING DATA [4] | … | 7 | 6 | DID : $**** | 0 | 0 | … |

DATA RECORDING DEVICE AND METHOD

CROSS-REFERENCE TO RELATED APPLICATION

This application claims priority to Japanese Patent Application No. 2022-018593 filed on Feb. 9, 2022, incorporated herein by reference in its entirety.

BACKGROUND

1. Technical Field

This disclosure relates to a data recording device and a method for recording a plurality of pieces of data on the state of a vehicle.

2. Description of Related Art

In the related art, there has been known a meter reading device that can acquire detailed information on measured values measured by a plurality of sensors (for example, see Japanese Unexamined Patent Application Publication No. 2012-190202 (JP 2012-190202 A)). In the meter reading device, sampling periods suitable for purposes of use of the measured values are stored. The meter reading device specifies a sampling period corresponding to a specified purpose of use and causes the sensors to execute measurement in the specified sampling period. Further, the meter reading device detects whether the measured values measured by the sensors have a change or not, and when the meter reading device detects the change in the measured values, the meter reading device extracts, as detailed information, measured values during a period when the change is detected. Further, JP 2012-190202 A also describes a reading meter including one or more sensors and configured to perform measurement such that a sampling period is set to an extremely short period requested to detailed data. In the reading meter, measured data is managed such that the measured data is divided by a given period, and a measured value A1 at a period start in a measurement period A is held as a representative value in the measurement period A. Further, the reading meter compares the measured value A1 with a measured value A2 at the end of the measurement period. In a case where a change amount between the measured values A1 and A2 exceeds a threshold, the measured values A1, A2 are stored in a storage area, and in a case where the change amount does not exceed the threshold, the measured values A1, A2 are discarded.

SUMMARY

Incidentally, it is conceivable that, in a vehicle, like the meter reading device disclosed in JP 2012-190202 A, a sampling period corresponding to a specified purpose of use is specified from sampling periods stored for respective purposes of use for each of a plurality of pieces of data on the state of the vehicle, and the pieces of data are measured in the specified sampling period. However, JP 2012-190202 A does not describe anything about how to specify a purpose of use or how to specify a sampling period, and it is difficult to obtain precise data while a sampling period is changed flexibly on the vehicle side in response to the needs. In the meantime, in a case where data in a measurement period is stored or discarded based on a change amount between with a measured value at the start of the measurement period and a measured value at the end of the measurement period like the reading meter described in JP 2012-190202 A, even when data is measured within an extremely short period, it is possible to restrain a used amount of the storage area. However, depending on how to divide the measurement period, even when the change amount exceeds a threshold, precise data corresponding to a generated phenomenon might not be obtained.

In view of this, a main object of this disclosure is to restrain an increase in a necessary capacity to record data and to flexibly and precisely record a plurality of pieces of data on the state of a vehicle in response to the needs.

A data recording device according to this disclosure is a data recording device for recording, in a basic recording period, a plurality of pieces of data on a state of a vehicle, the pieces of data being to be each acquired in a predetermined sampling period, the basic recording period being longer than the predetermined sampling period. At least one specified data specified by a vehicle external device from among the pieces of data is recorded in a shortened recording period equal to or more than the predetermined sampling period but less than the basic recording period.

A data recording method is a data recording method for recording, in a basic recording period, a plurality of pieces of data on a state of a vehicle, the pieces of data being to be each acquired in a predetermined sampling period, the basic recording period being longer than the predetermined sampling period. The data recording method includes recording at least one specified data specified by a vehicle external device from among the pieces of data in a shortened recording period equal to or more than the predetermined sampling period but less than the basic recording period.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is an explanatory view illustrating freeze frame data and optional recording data recorded by the data recording device according to this disclosure in response to the specification from the vehicle external device.

DETAILED DESCRIPTION OF EMBODIMENTS

With reference to the drawings, the following describes an embodiment to carry out the disclosure.

Figures 1, 2:
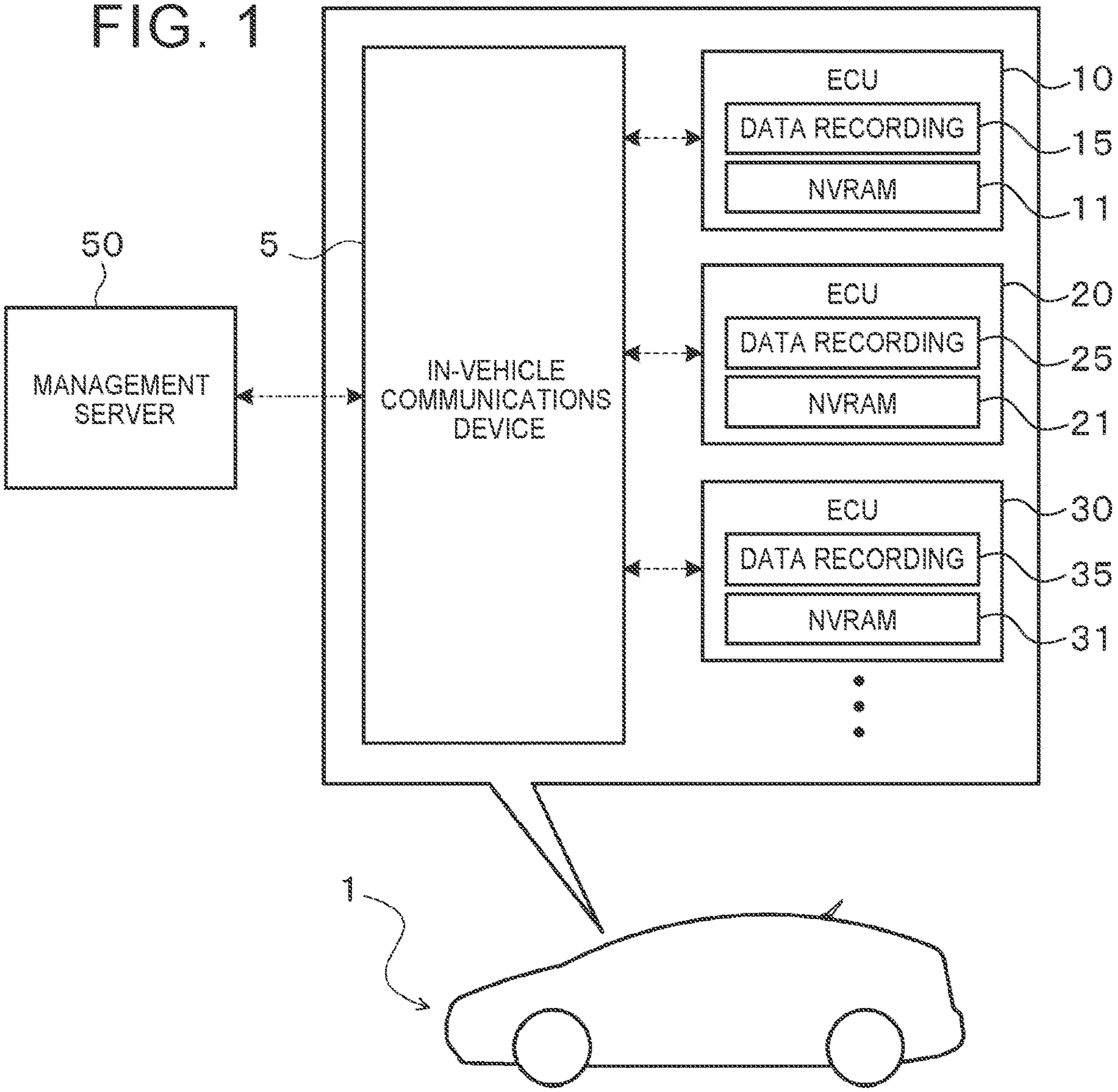
FIG. 1 is a schematic configuration diagram illustrating a vehicle including a data recording device according to this disclosure.
FIG. 2 is an explanatory view illustrating freeze frame data recorded by the data recording device according to this disclosure.

FIG. 1 is a schematic configuration diagram illustrating a vehicle 1 including a data recording device according to this disclosure. The vehicle 1 illustrated in the figure is a hybrid electric vehicle including, for example, an engine (an internal combustion engine), a motor generator, an inverter, a battery, and so on (not illustrated herein). The vehicle 1 includes an in-vehicle communications device 5 and a plurality of electronic control units (hereinafter referred to as "ECUS") 10, 20, 30, . . . , as illustrated herein. The in-vehicle communications device 5 can exchange information with a management server 50 or a terminal (including a portable terminal) to be used in, for example, a vehicle dealer or a vehicle repair shop as a vehicle external device via high-speed data communication (wireless packet communication) and also can exchange information with the ECUS 10 and so on.

The ECU 10, 20, 30 includes a microcomputer (not illustrated) including a CPU, a ROM, a RAM, an input-output interface, and so on (not illustrated) and a nonvolatile memory (NVRAM) 11, 21, 31. The ECU 10 controls the engine of the vehicle 1. The ECU 20 controls the inverter and the like configured to drive the motor generator of the vehicle 1. The ECU 30 manages the battery of the vehicle 1. Further, the ECU 10, 20, 30 includes a data recording module (a data recording device) 15, 25, 35 built in collaboration between an application (software) installed in the ECU 10, 20, 30 and hardware such as the CPU, the ROM, the RAM, and the nonvolatile memory 11, 21, 31.

The data recording module 15, 25, 35 stores (records), in the nonvolatile memory 11, 21, 31, a plurality of pieces of data (various physical quantities, setting states, and the like) on the state of the vehicle 1 each to be acquired (detected or calculated) in a predetermined sampling period Ts (e.g., from several milliseconds to dozens of milliseconds), as freeze frame data recorded in a basic recording period Trb (e.g., 500 msec) that is longer than the sampling period Ts. FIG. 2 is an explanatory view illustrating freeze frame data recorded by the data recording module 15 of the ECU 10. As illustrated in the figure, the freeze frame data is generated such that, in a predetermined storage area of the nonvolatile memory 11 or the like, a plurality of pieces of data determined in advance such as a vehicle speed and an engine revolution speed, for example, is aligned in a column direction, and values acquired in respective basic recording periods Trb for each of the pieces of data are aligned along a row direction and stored. Further, as illustrated herein, in an index for each row in the freeze frame data, the name (vehicle speed, engine revolution speed, or the like) of corresponding data and a data ID (identifier) given to the corresponding data in advance are stored. The freeze frame data is basically removed from the nonvolatile memory 11 or the like at the stage when a predetermined time elapses, for example, after the freeze frame data is recorded in the nonvolatile memory 11 or the like.

The freeze frame data recorded in the ECU 10, 20, 30 is transmitted to the management server 50 from the in-vehicle communications device 5 at predetermined cycles, for example. The management server 50 is provided and managed by a maker of the vehicle 1, for example, and includes a computer including a CPU, a ROM, a RAM, an input-output device, and so on, a communications module via which the management server 50 communicates with the in-vehicle communications device 5 of the vehicle 1, a storage device in which various pieces of information are stored, and so on. The management server 50 stores, in the storage device, the freeze frame data transmitted from the in-vehicle communications device 5 of the vehicle 1 in association with vehicle information such as a frame number or a vehicle number of the vehicle 1. The freeze frame data managed by the management server 50 is accessible from a terminal in a vehicle dealer, a repair shop, or the like. When some sort of abnormality occurs in the vehicle 1, freeze frame data not stored in the vehicle 1 can be acquired from the management server 50 and used for analysis or the like of a cause of the abnormal occurring in the vehicle 1.

Here, the freeze frame data to be recorded by the data recording module 15 or the like in the ECU 10 or the like is recorded in the basic recording period Trb that is relatively long as described above. Accordingly, there is such a possibility that the freeze frame data does not include data before and after the timing when an event such as an abnormality detection occurs in the vehicle 1. Further, in a case where the basic recording period Trb for the freeze frame data is made shorter, detailed data can be obtained. However, this increases costs along with an increase in the capacity of the nonvolatile memory 11, 21, 31 and increases a communication time of the in-vehicle communications device 5 with the management server 50 or the like. In the meantime, differently from rewriting of various programs as targets for various restrictions or the like, authentication is not necessary to change a data recording period in the data recording module 15 or the like.

Based on these points, in the vehicle 1, in response to a specification from the management server 50 as a vehicle external device, at least some of a plurality of pieces of data (a physical quantity or the like) included in freeze frame data to be recorded by the data recording module 15, 25, 35 can be recorded as optional recording data in a period (hereinafter referred to as a "shortened recording period Trs") that is less than the basic recording period Trb. In the present embodiment, at the time when the communication with the in-vehicle communications device 5 of the vehicle 1 is established (in the case of a default setting), the management server 50 transmits, to the in-vehicle communications device 5, a recording period notification to specify data that should be recorded in the shortened recording period Trs for each ECU 10, 20, 30 as a target in the vehicle 1. Further, when it is necessary to acquire some data in more detail along with a system update for a safety function or the like of the vehicle 1, or when it is necessary to acquire some data in more detail about the same vehicle type in response to occurrence of a malfunction or the like in other vehicles, the management server 50 also transmits the recording period notification to the in-vehicle communications device 5 of the vehicle 1.

Figure 3:
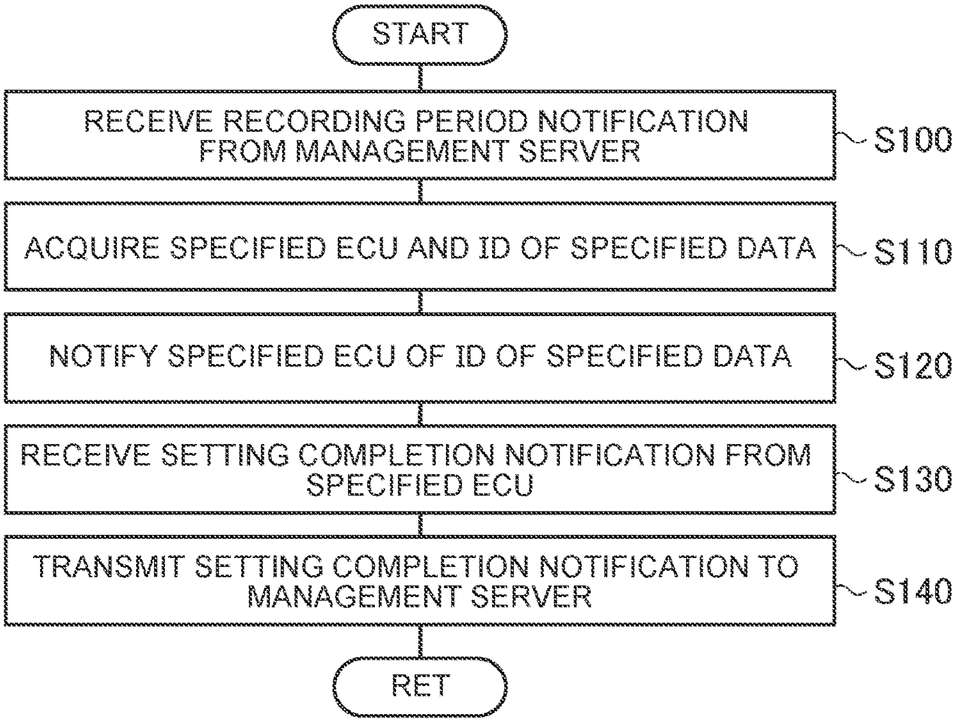
FIG. 3 is a flowchart illustrating one example of a routine to be executed by an in-vehicle communications device of the vehicle including the data recording device according to this disclosure.

FIG. 3 is a flowchart illustrating one example of a routine to be executed by the in-vehicle communications device 5 of the vehicle 1 in response to transmission of a recording period notification from the management server 50. As illustrated in FIG. 3, when the in-vehicle communications device 5 receives a recording period notification from the management server 50 (step S100), the in-vehicle communications device 5 acquires, from the recording period notification, an ECU (hereinafter referred to as a "specified ECU") specified by the management server 50 and a data ID of data (hereinafter referred to as "specified data") specified by the management server 50 as data that should be recorded in the shortened recording period Trs (step S110). The recording period notification may include at least either of a plurality of specified ECUS and a plurality of data IDS of pieces of specified data or may include at least either of one specified ECU and one data ID of specified data. The following describes the routine of FIG. 3 on the premise that the specified ECU is the ECU 10 and the specified data is a "vehicle speed."

After the process of step S110, the in-vehicle communications device 5 transmits, to the ECU 10 as the specified ECU, a notification indicating that the vehicle speed should be recorded in the shortened recording period Trs (step S120). The ECU 10 that has received the notification from the in-vehicle communications device 5 sets a predetermined shortened recording period Trs (e.g., 100 msec) as a recording period for the vehicle speed in the data recording module 15, in addition to the abovementioned basic recording period Trb (e.g., 500 msec). Hereby, the data recording module 15 stores, in the nonvolatile memory 11, the vehicle speed acquired by a vehicle speed sensor (not illustrate) as freeze frame data in the basic recording period Trb and also stores, in the nonvolatile memory 11, the vehicle speed acquired by the vehicle speed sensor as optional recording data in the shortened recording period Trs.

After the ECU 10 as the specified ECU changes the recording period for the vehicle speed in the data recording module 15, the ECU 10 transmits, to the in-vehicle communications device 5, a setting completion notification indicating that the setting change in the recording period is completed. When the in-vehicle communications device 5 receives the setting completion notification from the ECU 10 as the specified ECU (step S130), the in-vehicle communications device 5 transmits, to the management server 50, a setting completion notification indicating that the setting change in the recording period for the specified data ID in the specified ECU is completed on the vehicle 1 side (step S140). Here, the in-vehicle communications device 5 ends the series of processes in FIG. 2.

Figure 4:
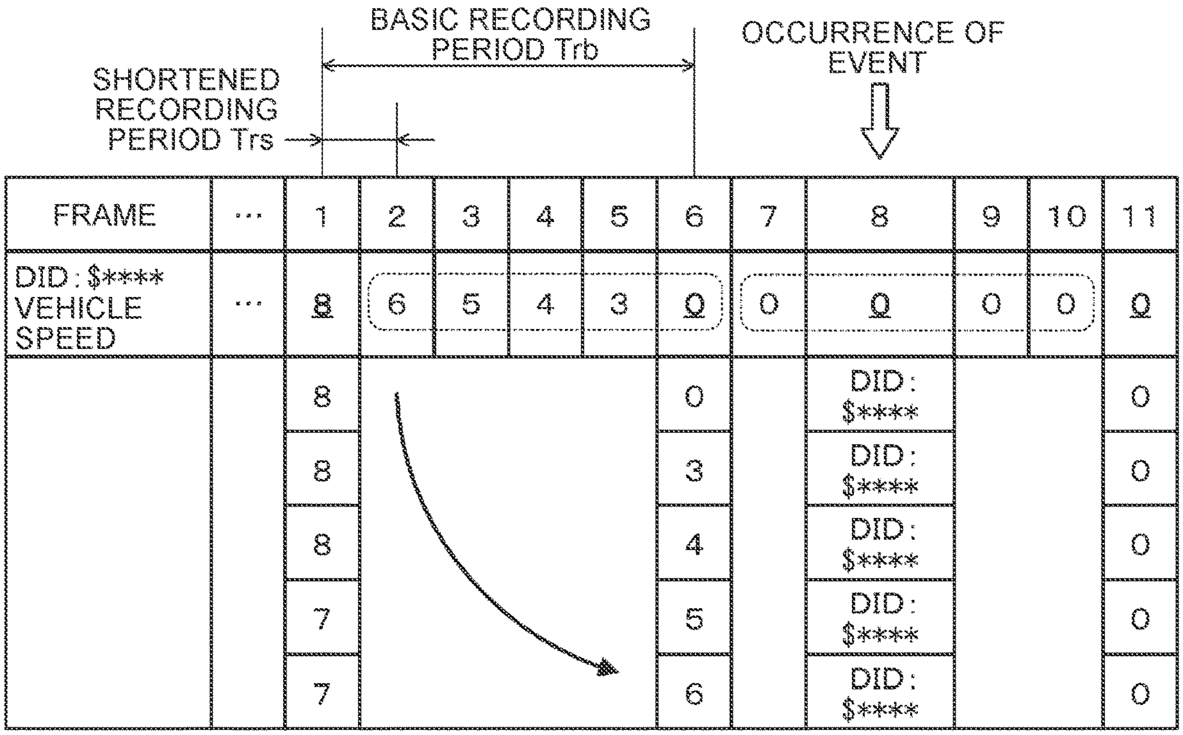
FIG. 4 is an explanatory view to describe the procedure for the data recording device according to this disclosure to record, in response to a specification from a vehicle external device, specified data in a basic recording period and in a shortened recording period.

FIG. 4 is an explanatory view to describe the procedure for the data recording module 15 of the ECU 10 as the specified ECU to record the vehicle speed as the specified data in the basic recording period Trb and in the shortened recording period Trs in response to the recording period notification from the management server 50. Further, FIG. 5 is an explanatory view illustrating freeze frame data and optional recording data recorded by the data recording module 15 in response to the recording period notification from the management server 50.

As illustrated in FIGS. 4, 5, in response to a specification from the management server 50 to record the vehicle speed (specified data) in the shortened recording period Trs, the data recording module 15 acquires vehicle speeds in respective shortened recording period Trs, in terms of the vehicle speed to be acquired in a predetermined sampling period Ts by the vehicle speed sensor. Further, the data recording module 15 stores, in the storage area of the nonvolatile memory 11, vehicle speeds corresponding to respective basic recording periods Trb from among the acquired vehicle speeds as freeze frame data such that the vehicle speeds are aligned in the row direction. Further, the data recording module 15 stores, as pieces of optional recording data, the vehicle speeds acquired in the shortened recording periods Trs in the storage area of the nonvolatile memory 11 such that the vehicle speeds are aligned, in the column direction, with their corresponding ones of the vehicle speeds stored in the respective basic recording periods Trb.

More particularly, every time when the basic recording period Trb passes, the data recording module 15 stores a vehicle speed (e.g., a vehicle speed in a frame 1 in FIG. 4) acquired in the shortened recording period Trs in the storage area of the nonvolatile memory 11 such that the acquired vehicle speeds are aligned in the row direction. Further, the data recording module 15 acquires a vehicle speed every time when the shortened recording period Trs passes, and the data recording module 15 stores the acquired vehicle speeds (e.g., vehicle speeds from a frame 2 to a frame 5 in FIG. 4) in the storage area of the nonvolatile memory 11 in the order of data acquisition such that the acquired vehicle speeds are aligned in the column direction from the lower side to the upper side in the figure, for example, relative to a vehicle speed (e.g., a vehicle speed in a frame 6 in FIG. 4 to be stored in a data position "−1" in FIG. 5) to be stored in the storage area when a subsequent basic recording period Trb passes. In the present embodiment, as illustrated in FIGS. 4, 5, the shortened recording period Trs is a divisor of the basic recording period Trb. Accordingly, the vehicle speed (e.g., the vehicle speed in the frame 6 in FIG. 4) stored in the basic recording period Trb is also stored as optional recording data in a field below the vehicle speed (e.g., the vehicle speed stored in the data position "−1" in FIG. 5) stored in the basic recording period Trb.

Further, in response to the occurrence of an event such as an abnormality detection by a diagnostic function of the vehicle 1, the data recording module 15 stores one vehicle speed (e.g., a vehicle speed in a frame 8 in FIG. 4) acquired as the specified data in the shortened recording period Trs in the storage area of the nonvolatile memory 11 as the freeze frame data such that the vehicle speed is aligned, in the row direction, with vehicle speeds (e.g., vehicle speeds in the frame 6 and a frame 11 in FIG. 4) to be stored in respective basic recording periods Trb. Further, the data recording module 15 stores identical data IDS corresponding to the vehicle speed as the specified data as pieces of optional recording data in the storage area of the nonvolatile memory 11 such that the identical data IDS are each aligned, in the row direction, with vehicle speeds stored in respective shortened recording periods Trs and are aligned, in the column direction, with the one vehicle speed (the vehicle speed in a data position "0" in FIG. 5). Note that, in a case where the ECU 20, 30 is specified as the specified ECU by the management server 50, the data recording module 25, 35 stores freeze frame data and optional recording data in the nonvolatile memory 21, 31 along the procedure described with reference to FIGS. 4, 5. Further, in the present embodiment, in response to the occurrence of an event, removal of the freeze frame data and the optional recording data of the ECU 10 or the like is prohibited.

As described above, the data recording module 15, 25, 35 constituting the data recording device of the vehicle 1 records a plurality of pieces of data (a physical quantity or the like) on the state of the vehicle 1 as freeze frame data recorded in the basic recording period Trb longer than the sampling period Ts. Further, the data recording module 15, 25, 35 records at least one specified data specified by the management server (the vehicle external device) 50 among the pieces of data as optional recording data recorded in the shortened recording period Trs equal to or more than the sampling period Ts but less than the basic recording period Trb. By recording only the specified data specified by the management server 50 in the shortened recording period Trs, it is possible to restrain an increase in the capacity of the nonvolatile memory 11, 21, 31. Further, on the management server 50 side, it is possible to flexibly and precisely determine specified data that should be recorded in the shortened recording period Trs in response to the needs that change variously, in comparison with the vehicle 1 side that has much restriction. As a result, with the data recording module 15, 25, 35, it is possible to restrain an increase in the capacity necessary to record data and to flexibly and precisely record a plurality of pieces of data on the state of the vehicle 1 in response to the needs.

Further, the data recording module 15, 25, 35 of the vehicle 1 stores pieces of specified data in respective basic recording periods Trb in the storage area of the nonvolatile memory 11, 21, 31 as freeze frame data such that the pieces of specified data are aligned in the row direction. Further, the data recording module 15, 25, 35 of the vehicle 1 stores, as optional recording data, pieces of specified data acquired in respective shortened recording period Trs in the storage area of the nonvolatile memory 11 or the like in the shortened recording period Trs such that the pieces of specified data are aligned, in the column direction, with their corresponding data to be stored in the basic recording period Trb. Hereby, detailed optional recording data can be recorded in the shortened recording period Trs without changing the format (the format in the row direction) for freeze frame data to be recorded in the basic recording period Trb.

Further, in response to the occurrence of an event such as an abnormality detection, the data recording module 15, 25, 35 of the vehicle 1 stores one specified data acquired in the shortened recording period Trs in the storage area of the nonvolatile memory 11 or the like such that the one specified data is aligned, in the column direction, with pieces of specified data to be stored in respective basic recording periods Trb, and the data recording module 15, 25, 35 of the vehicle 1 stores identical data IDS (identifiers) corresponding to the specified data in the storage area of the nonvolatile memory 11 or the like such that the data IDS are each aligned, in the row direction, with pieces of specified data to be stored in respective shortened recording periods Trs and are aligned, in the column direction, with the one specified data. Hereby, pieces of specified data to be recorded in the shortened recording period Trs can have an identifier corresponding to specified data to be recorded in the basic recording period Trb. As a result, based on the data ID, detailed time series data can be restored from the specified data recorded in the basic recording period Trb and the pieces of specified data recorded in the shortened recording periods Trs.

Note that the shortened recording period Trs is not limited to a predetermined time stored in the vehicle 1 and may be a period (time) specified by the management server 50 as the vehicle external device. Further, the shortened recording period Trs does not necessarily need to be a divisor of the basic recording period Trb. Further, the specified ECU, the specified data, and the shortened recording period Trs may be set by a terminal used in a vehicle dealer or a vehicle repair shop as a vehicle external device other than the management server 50. Further, the terminal (including a portable terminal) in the vehicle dealer or the vehicle repair shop may be connected to the data recording module 15 or the like by wired or wireless communication so as to diagnose a failure in the vehicle 1. Further, the embodiment of this disclosure as described above may be applied to a data logger provided in the vehicle 1 and configured to regularly record a plurality of pieces of data in a predetermined basic recording period. Further, the vehicle 1 is not limited to a hybrid electric vehicle and may be a vehicle using only an engine as a power emission source or may be a battery electric vehicle (including a fuel cell electric vehicle).

As described above, the data recording device of this disclosure records a plurality of pieces of data on the state of a vehicle in a basic recording period longer than a sampling period and records at least one specified data specified by a vehicle external device among the pieces of data in a shortened recording period equal to or more than the sampling period but less than the basic recording period. Thus, by recording only the specified data specified by the vehicle external device in the shortened recording period, it is possible to restrain an increase in a capacity necessary to record data. Further, on the vehicle external device side, it is possible to flexibly and precisely determine specified data that should be recorded in the shortened recording period in response to the needs that change variously, in comparison with the vehicle side that has much restriction. As a result, with the data recording device of this disclosure, it is possible to restrain an increase in the capacity necessary to record data and to flexibly and precisely record the pieces of data on the state of the vehicle in response to the needs. Note that the shortened recording period may be a predetermined time stored on the vehicle side or may be a period (time) specified by the vehicle external device.

Further, the data recording device may store pieces of specified data as the at least one specified data in the storage area in respective basic recording periods such that the pieces of specified data are aligned in the row direction. Further, the data recording device may store, in the storage area, given pieces of specified data acquired in respective shortened recording periods as the at least one specified data such that the given pieces of specified data are aligned, in the column direction, with a corresponding one of the pieces of specified data stored in the respective basic recording periods. Hereby, detailed data can be recorded in the shortened recording period without changing the format (the format in the row direction) for data to be recorded in the basic recording period.

Further, in response to the occurrence of an even, the data recording device may store, in the storage area, one specified data acquired in the shortened recording period as the at least one specified data such that the one specified data is aligned, in the row direction, with the pieces of specified data stored in the respective basic recording periods, and the data recording module may store, in the storage area, identical identifiers corresponding to the at least one specified data such that the identical identifiers are each aligned, in the row direction, with pieces of specified data to be stored in respective shortened recording periods and are aligned, in the column direction, with the one specified data thus acquired. Hereby, pieces of specified data to be recorded in respective shortened recording periods can have an identifier of their corresponding specified data to be recorded in the basic recording period. Accordingly, based on the identifiers, it is possible to restore detailed time series data from the specified data recorded in the basic recording period and the pieces of specified data recorded in the respective shortened recording periods.

Further, the vehicle external device may be at least either one of the followings: a management server configured to acquire the pieces of data from the vehicle via a communications device provided in the vehicle and manage the pieces of data; and a terminal connected to the data recording device to diagnose a malfunction in the vehicle.

Further, the data recording device may regularly record the pieces of data in the basic recording period.

With the data recording method of this disclosure, it is possible to restrain an increase in the capacity necessary to record data and to flexibly and precisely record a plurality of pieces of data on the state of a vehicle in response to the needs.

Note that this disclosure is not limited to the above embodiment at all, and it goes without saying that various alterations can be made within an extensional range of this disclosure. Further, the embodiment is just one specific aspect of the disclosure described in the field of SUMMARY in every respect and does not limit the elements of the disclosure described in the field of SUMMARY.

The disclosure is applicable in the manufacture industry of a vehicle, and so on.

What is claimed is:

1. A data recording device configured to:

acquire a plurality of pieces of data on a state of a vehicle during a predetermined sampling period;

record a first subset of the plurality of pieces of data during a basic recording period, the basic recording period being longer than the predetermined sampling period; and record a second subset of the plurality of pieces of data during a shortened recording period equal to or more than the predetermined sampling period but less than the basic recording period.

2. The data recording device according to claim 1, wherein a management server is configured to acquire the pieces of data from the vehicle via a communications device provided in the vehicle and manage the pieces of data; and a terminal is connected to the data recording device to diagnose a malfunction in the vehicle.

3. The data recording device according to claim 1, wherein the pieces of data are recorded regularly in the basic recording period.

4. A data recording method comprising:

acquiring a plurality of pieces of data on a state of a vehicle during a predetermined sampling period;

recording a first subset of the plurality of pieces of data during a basic recording period, the basic recording period being longer than the predetermined sampling period; and recording a second subset of the plurality of pieces of data during a shortened recording period equal to or more than the predetermined sampling period but less than the basic recording period.

* * * * *